UNITED STATES PATENT OFFICE.

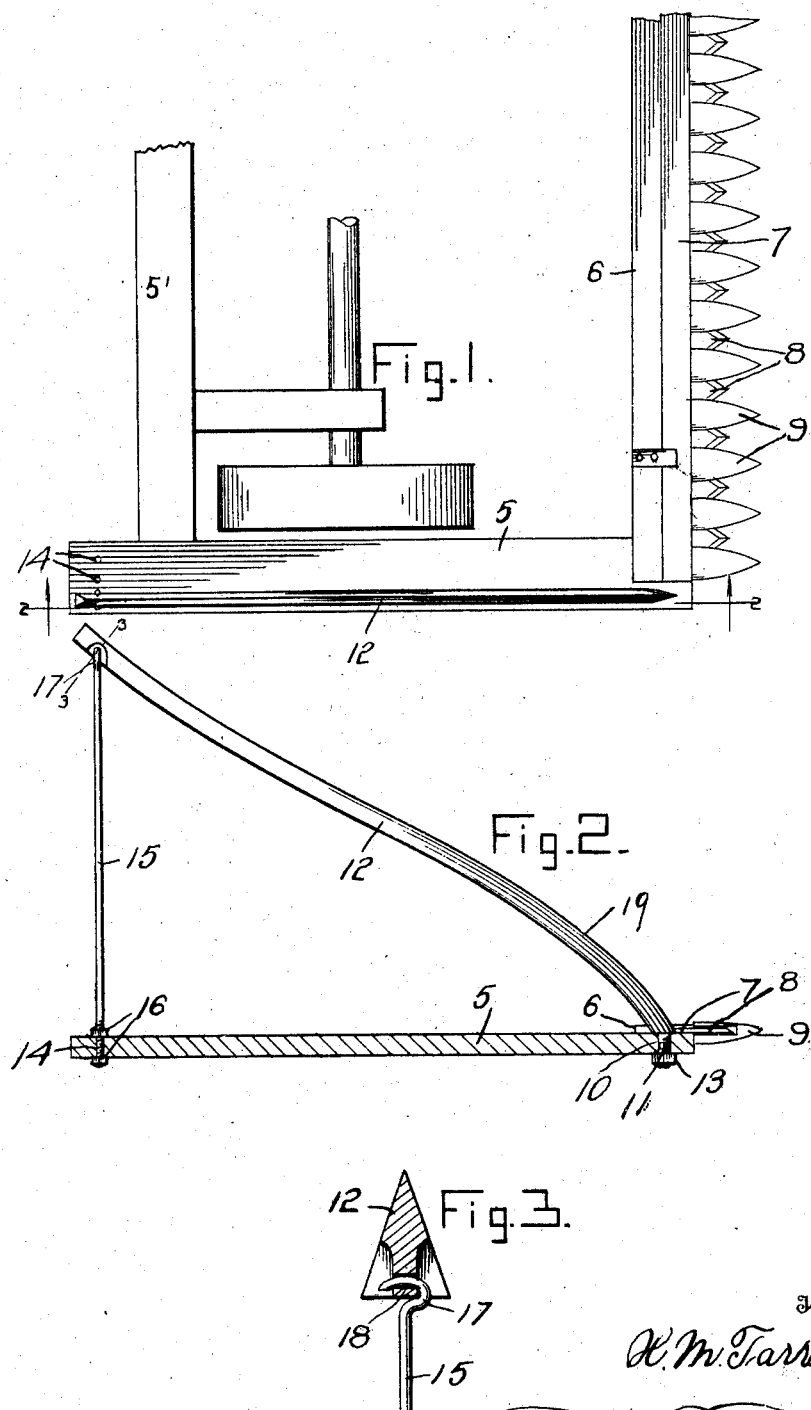

HUGH M. TARRANT, OF BEULAHVILLE, VIRGINIA.

ATTACHMENT FOR MOWING-MACHINES.

No. 865,066.  Specification of Letters Patent.  Patented Sept. 3, 1907.

Application filed January 9, 1907. Serial No. 351,514.

*To all whom it may concern:*

Be it known that I, HUGH M. TARRANT, a citizen of the United States, residing at Beulahville, in the county of King William, State of Virginia, have invented certain new and useful Improvements in Attachments for Mowing-Machines; and I do hereby declare the following to be a full, clear, and exact description of the invention, such as will enable others skilled in the art to which it appertains to make and use the same.

The present invention relates to attachments for mowing machines.

In operating machines of the class above referred to, the constant clogging and choking of the blades from overhanging vines has proved a source of great annoyance, as the vines tend to work in between the guard-fingers and the cutter blades and not only dull the edges of the latter but prevent the cutter plate from moving freely on the guard plate.
It is the object of the present invention, therefore, to provide means whereby the vines may be cut before they can choke the blades, and to this end the invention resides in the provision of a curved blade secured at its front end to the corresponding end of one of the supporting plates to which the cutting mechanism is attached, and disposed at an angle to the latter, so that the branches of the vines will contact with and slide along the cutting edge thereof and be cut thereby.

The invention further consists in the construction, combination, and arrangement of parts, all as hereinafter fully described, specifically claimed, and illustrated in the accompanying drawings, in which like parts are designated by corresponding reference numerals in the several views.
Of the said drawings: Figure 1 is a top plan view of the invention, showing a portion of the cutting mechanism of the machine and of one of the supporting plates by which such mechanism is carried. Fig. 2 is a sectional view taken on the line 2—2 of Fig. 1. Fig. 3 is an enlarged transverse section taken on the line 3—3 of Fig. 2.

Referring more particularly to the drawings, 5 designates one of the usual supporting plates of a mowing machine, which is connected at its rear end to the frame 5' of the latter (a portion of which is shown) and at its opposite end to one end of the usual guard-plate 6, which constitutes a portion of the cutting mechanism, the knife-plate 7 moving endwise thereover and being provided with the knives 8 which travel across the fingers 9 of the guard-plate as is customary in machines of this class.

Formed through the support 5 at the front end thereof is a vertical opening 10 through which the reduced end 11 of the vine-cutting blade 12 extends, said end being threaded and carrying a nut 13 by means of which it is held in place in said opening. The support 5 is further provided with a series of openings 14 formed therethrough towards its rear end, the lower end of a metal rod or strap 15 being passed through one of said openings and held in place by nuts 16, which are movable along the threaded end of said strap, and are adapted to bear against the opposite faces of said support. The opposite end of said strap is provided with a hook 17, which is adapted to be engaged in an opening 18 formed through blade 12 towards the rear face thereof adjacent the rear end thereof. The strap 15 thus serves to support the rear end of blade 12 and is sufficiently rigid to retain said end in raised position, so that the blade is inclined with respect to the cutting mechanism of the machine, which consists of the plates 6 and 7 and their attendant fingers and knives, above referred to. It will likewise be apparent that the provision of the several openings 14 will permit a slight radial adjustment of the blade 12, the lower end of which serves as the pivot on which the blade swings.

As shown in Fig. 2, the cutting blade is slightly convexed or bowed towards its lower end, as indicated by the reference numeral 19, thus presenting a forwardly projecting portion against which the branches of the vines contact, sliding therealong and being severed thereby.

It has not been thought necessary to illustrate the means for operating the cutter plate 7, as the same forms no part of the present invention, and is, moreover, common to all mowing machines of the type shown. Further description of the machine and its attendant parts is likewise deemed unnecessary in view of the foregoing.

What is claimed, is—

The combination, with the frame of a mowing machine, of guard and cutter plates, a forwardly and rearwardly extending support for said plates secured to the machine frame, said support having a single opening formed therethrough adjacent its front end and a series of openings adjacent its rear end, a rearwardly and upwardly extending vine-cutting blade having its front end fitting loosely in said first-mentioned opening, and a strap connected at one end to said blade towards the rear end thereof, the opposite end of said strap being removably engaged in one of said last-mentioned openings.

In testimony whereof, I affix my signature, in presence of two witnesses.

HUGH M. TARRANT.

Witnesses:
BERNARD FOX,
BELLE J. FOX.